United States Patent

Ruohola et al.

[11] Patent Number: 5,112,441
[45] Date of Patent: May 12, 1992

[54] PROCESS FOR THE RECOVERY OF HEAT AND CHEMICALS FROM SPENT LIQUOR

[75] Inventors: Tuomo Ruohola; Erik Saiha, both of Tampere; Kari Kuukkanen, Ylöjäravi; Paavo Hyöty, Tampere, all of Finland

[73] Assignee: Oy Tampella AB, Tampere, Finland

[21] Appl. No.: 565,220

[22] Filed: Aug. 7, 1990

Related U.S. Application Data

[63] Continuation of Ser. No. 855,899, Apr. 24, 1986, abandoned.

[30] Foreign Application Priority Data

Apr. 25, 1985 [FI] Finland .................. 851641

[51] Int. Cl.⁵ .................. B01D 1/00; B01D 3/06
[52] U.S. Cl. .................. 159/47.3; 159/2.1; 159/22; 162/31; 162/47; 203/2; 203/14; 203/73; 203/80; 203/88
[58] Field of Search ......... 159/2.1, 22, 47.3, DIG. 40; 203/2, 14, 73, 80, 88, DIG. 25, DIG. 8; 162/41, 31

[56] References Cited

U.S. PATENT DOCUMENTS

| 1,719,130 | 7/1929 | Richter et al. | 159/47.3 |
|---|---|---|---|
| 2,891,843 | 6/1959 | Moxness | 159/47.3 |
| 3,216,788 | 11/1965 | Hoeft | 159/47.3 |
| 3,414,038 | 12/1968 | Laakso | 162/47 |
| 3,425,477 | 2/1969 | Forin | 162/47 |
| 3,428,107 | 2/1969 | Backteman | 159/47.3 |
| 3,703,919 | 11/1972 | Owens et al. | 159/47.3 |
| 3,912,577 | 10/1975 | Akune et al. | 159/47.3 |
| 4,441,437 | 4/1984 | Moskau | 159/47.3 |
| 4,530,737 | 7/1985 | Ostman | 159/47.3 |
| 4,687,546 | 8/1987 | Willis | 159/47.1 |
| 4,857,146 | 8/1989 | Andersson | 159/47.3 |
| 4,909,899 | 3/1990 | Kiiskilä159 | 47.3/ |

FOREIGN PATENT DOCUMENTS

| 1049713 | 3/1979 | Canada | 162/47 |
|---|---|---|---|
| 1097465 | 3/1981 | Canada | 162/47 |
| 1200055 | 2/1986 | Canada | 159/47.3 |

Primary Examiner—Virginia Manoharan
Attorney, Agent, or Firm—Dressler, Goldsmith, Shore, Sutker & Milnamow

[57] ABSTRACT

A process for the recovery of heat and chemicals from spent liquor by evaporating water out from it in order to concentrate the liquor and be feeding the concentrated liquor thereby obtained and air into the soda-ash furnace. In order to increase the dry-matter content of the liquor to a level higher than usual, without at the same time increasing the viscositty of the liquor immoderately, at least the final concentrating (5, 9) of the liquor and its feeding (16) into the soda-ash furnace (4) are carried out under pressure at a temperature higher than the atmospheric boiling point of the liquor.

3 Claims, 2 Drawing Sheets

PROCESS FOR THE RECOVERY OF HEAT AND CHEMICALS FROM SPENT LIQUOR

This application is a continuation of application Ser. No. 06/855,899, filed Apr. 24, 1986, now abandoned.

The present invention relates to a process for the recovery of heat and chemicals from spent liquor by evaporating water out from the liquor in order to concentrate it and by feeding the concentrated liquor thereby obtained and air into a soda-ash furnace.

Spent liquor is produced in the pulping process, and for the economy of pulp production it is very important to recover the heat content and chemicals of this spent liquor as fully as possible. In order to release the thermal energy and to recover the chemicals, before the spent liquor is burned, water is evaporated out from it to such an extent that a liquor which contains water approximately 35% or less is obtained, and this liquor is burned in the soda-ash furnace. The energy released during the combustion can be exploited in the pulping process, and the chemicals can be recovered from the bottom of the soda-ash furnace and, after regeneration, be used for preparing cooking liquor.

As the price of energy has risen continually, it has become increasingly important to make the burning of liquor in the soda-ash furnace as disturbance-free as possible in order to achieve good chemicals economy, low emissions, high energy efficiency, and good energy economy.

The primary function of the soda-ash furnace is to recover chemicals and to regenerate them for the preparation of cooking liquor. For this purpose a reducing zone is created in the lower part of the soda-ash furnace; a high temperature prevails in this zone and a stack of the chemicals to be recovered forms in the lower part of the furnace. Losses of chemicals, for their part, are used for measuring the recovery of the salts. Losses are incurred when gases, such as sulfur dioxide, are emitted along with the flue gases.

It is also a function of the soda-ash furnace to recover heat from the flue gases. The effectiveness of the heat recovery can be measured in terms of the flue gas losses, i.e. the proportion of unburnt gases, and in terms of the usability of the furnace, for example stoppages due to the soilage of the heating surfaces.

The operation of the soda-ash furnace is affected by many factors. The liquor fed into the soda-ash furnace usually contains a relatively high proportion of water, approximately 35-40%. This water amount must be caused to evaporate in the soda-ash furnace, and the evaporation must take place substantially from the liquor drops falling towards the stack on the bottom of the soda-ash furnace, before the drops reach the surface of the stack. Otherwise a large proportion of the water must be evaporated from the surface of the stack, which decreases the temperature of the stack and, in turn, increases the emission of sulfur dioxide and decreases reduction.

If the content of water in the liquor decreases, also the combustion conditions improve so that the requirements set on soda-ash furnaces are fulfilled to a greater extent, i.e. emissions and losses of sulfur dioxide decrease, the reduction improves, and the degree of heat recovery rises. At the same time the amount of flue gas decreases, whereupon the combustion capacity of the soda-ash furnace per volume unit increases. The usability of the furnace also improves.

In the previously known processes the spent liquor is directed, after concentration, into a storage and/or equalizing tank, from where it is pumped into the mixing tank. In the mixing tank, fly ash, and possibly make-up salt, is added to the liquor. Finally the liquor is pumped from the mixing tank into the soda-ash furnace. The tanks are open and are at atmospheric pressure. To prevent vaporization, the operation must take place at temperatures which are below the boiling point of the liquor. The dry-matter content of the liquor is usually approximately 60%, and at maximum 65-68%, depending on the type of liquor.

At these dry-matter contents the viscosity of the liquor is still so low that the liquor can be treated and transferred at temperatures which are below its boiling point. When the dry-matter content further increases, also the viscosity increases, and since viscosity is dependent on the temperature, when the dry-matter content increases the temperature has to be further increased in order that the liquor could be transferred and injected into the soda-ash furnace. Eventually, however, the dry-matter content rises so high that the liquor becomes so viscous that it can no longer be treated using the equipment available.

The object of the present invention is therefore to provide a process for the recovery of heat and chemicals from spent liquor which has a dry-matter content higher than ordinary but which, nevertheless, can be transferred and injected into the soda-ash furnace.

The main characteristics of the invention are given in the accompanying claims.

By carrying out the concentrating of the liquor and its feeding into the soda-ash furnace under pressure and at a temperature higher than the atmospheric boiling point of the liquor, in accordance with the invention, the liquor can be concentrated to a dry-matter content higher than usual without the viscosity of the liquor being thereby raised to an unmanageable level.

By the method according to the invention the liquor can be concentrated to a dry-matter content of over 65%, and even over 80%, without insurmountable problems being yet caused by the viscosity of the liquor.

In a preferred embodiment of the invention, liquor is concentrated and fed into the soda-ash furnace at a temperature of at least 115° C. Before being fed into the soda-ash furnace the liquor can be concentrated further by subjecting it to expansion evaporation, whereafter the pressure of the expansion-evaporation liquor can be increased by mechanical pumping before it is fed into the soda-ash furnace.

Fly ash and/or make-up chemicals can be added to the liquor before it is concentrated. Alternatively, part of the fly ash can be blown into the combustion chamber of the soda-ash furnace together with combustion air. The blowing of fly ash into the combustion chamber of the soda-ash furnace can also be carried out at a point below the point at which the liquor is injected.

Water can be evaporated out from the liquor by using an evaporation apparatus known per se, such as a falling-film type concentrator, by means of which the volume and dry-matter content of the liquor are regulated.

BRIEF DESCRIPTION OF THE DRAWINGS

The invention is described below in greater detail with reference to the accompanying drawings, in which.

DESCRIPTION OF THE PREFERRED EMBODIMENT

Figure 1:
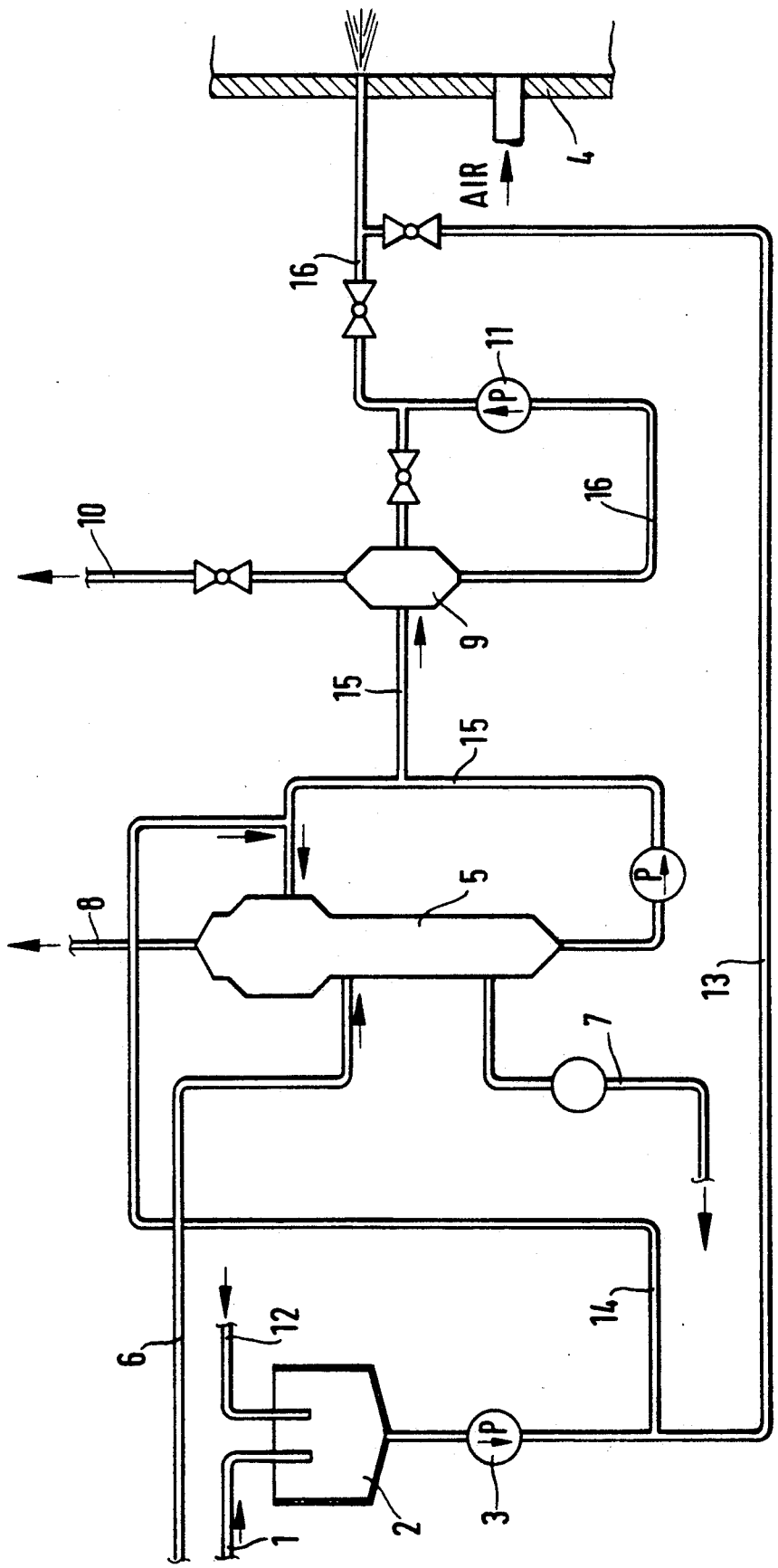
FIG. 1 is a flow chart of the apparatus intended for applying the process according to the invention.

In the drawing, the mixing tank in general is indicated by reference numeral 2. A liquor which in a conventional evaporating plant has been evaporated to a dry-matter content of approximately 58-65% is fed through pipe 1 into the mixing tank 2. In addition, fly ash can be fed through pipe 12 into the mixing tank 2. By means of pump 3, liquor is fed from the mixing tank 2 either directly into the soda-ash furnace 4 through pipe 13, or in accordance with the present invention through pipe 14 into an additional concentrator 5, in which the liquor is heated by means of steam, the condensate of the concentrator leaving through pipe 7. The concentrator 5 is closed and the evaporation of of liquor in it takes place under pressure, in which case exploitable vapor 8 can be recovered from the upper part of the concentrator 5, and liquor having a dry-matter content of 65-80% is pumped from the lower part through pipe 15 into the expansion tank 9, in which there prevails a pressure slightly lower than in the evaporator 5, so that part of the water present in the liquor is further vaporized. Vapor 10 at overpressure is recovered from the upper part of the expansion tank 9 and liquor having a dry-matter content of over 80% is removed from its lower part through pipe 16 and is pumped by means of pump 11 to the liquor nozzles of the soda-ash furnace 4. In the expansion tank 9 the liquor can be concentrated to an even higher dry-matter content, while the temperature and pressure of the liquor decrease, but not so much, however, that the viscosity of the liquor would rise so high that the liquor could not be pumped by means of pump 11 and be injected into the soda-ash furnace 4 by means of the liquor nozzles. Furthermore, by means of pump 11 the pressure of the liquor can be increased, and in order to lower the viscosity of the liquor, a less viscous liquor directly from the mixing tank 2 can be added to the liquor flowing in pipe 16. Furthermore, part of the liquor flowing in pipe 16 can be returned to the expansion tank 9.

The temperature of the liquor, and thereby its viscosity, can thus, when necessary, be adjusted by means of an expansion tank 9 placed between the concentrator and the combustion nozzles of the soda-ash furnace and by means of a preheater. The temperature of the liquor can be lowered by expanding the liquor in the expansion tank 9 to the pressure corresponding to the desired temperature. When increase of the liquor temperature is desired, the liquor is heated by means of steam in an additional concentrator 5 serving as a preheater. When need be, the pressure of the liquor can be increased by pump 11 after the expansion tank 9.

The fly ash and the make-up chemicals 12 are fed either directly into the combustion chamber of the soda-ash furnace 4 together with combustion air or into the mixing tank 2, which is located before the additional concentrator 5, or to both at a ratio appropriate in terms of the combustion.

By the method according to the invention the water content of the liquor can be lowered as much as to one-half of the present level. Thus it is clear that the combustion in the soda-ash furnace will be substantially more economical. The combustion of liquor in the soda-ash furnace 4 can be regulated in, for example, the manner described in Finnish Lay-Open Print 64409.

Figure 2:
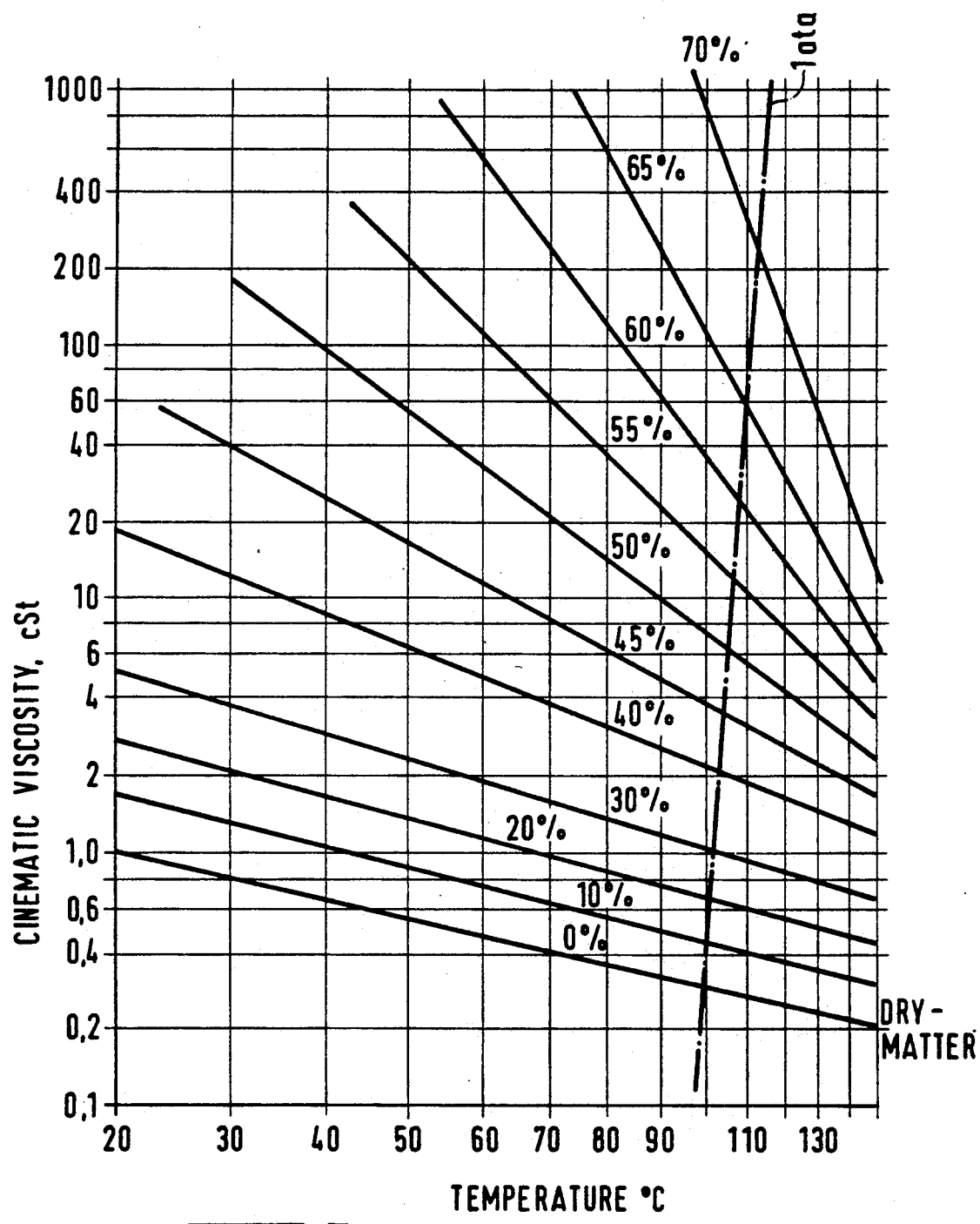
FIG. 2 depicts the temperature dependence of the viscosity of a typical black liquor at different solids contents.

As is seen in greater detail in FIG. 2, the viscosity of liquor is highly dependent on the temperature of the liquor, and the higher the solids content the sharper the rise of viscosity as the temperature rises. In practice, the pumping and injecting of black liquor is still possible when the kinematic viscosity is 200 cSt. It is seen in FIG. 2 that the viscosity of liquor rises above 200 cSt when the dry-matter content of the liquor rises to approximately 69% even if the temperature of the liquor is raised as high as possible under atmospheric pressure, i.e. to the atmospheric boiling point of the liquor. Thus the liquor must be heated in a pressure vessel if it is desired to increase the dry-matter content to above the above-mentioned value and pump it under pressure into the soda-ash furnace.

We claim:

1. A process for the recovery of heat and chemicals from spent liquors containing solids consisting essentially of the steps of:
    (a) evaporating water from the liquor in a concentrator vessel to increase the concentration of the solids therein to above 65% by heating under pressure greater than atmospheric to a temperature above the atmospheric boiling point of the liquor;
    (b) feeding the liquor from the concentrator vessel to an expansion vessel where the pressure and temperature are lowered but still maintained above the atmospheric pressure and above the atmospheric boiling point of the liquor to further increase the concentration of the solids therein to above 80% without increasing the kinematic viscosity of the liquor above about 200 cSt.; and
    (c) feeding the concentrated liquor into a soda-ash furnace while maintaining the raised pressure and a temperature of at least 115° C. in the expansion vessel.

2. A process according to claim 1 wherein the evaporation in step (a) is carried out by heating with steam.

3. A process according to claim 1 wherein fly ash or make-up chemicals are added to the spent liquor before the liquor is fed into the concentrator vessel.

* * * * *